United States Patent
Yoshida et al.

(10) Patent No.: US 10,962,251 B2
(45) Date of Patent: Mar. 30, 2021

(54) AIR CONDITION MANAGEMENT APPARATUS, SYSTEM, AND METHOD

(71) Applicant: Hitachi-Johnson Controls Air Conditioning, Inc, Tokyo (JP)

(72) Inventors: Yasutaka Yoshida, Tokyo (JP); Koji Naito, Tokyo (JP); Hayato Mori, Tokyo (JP); Robert D. Turney, Watertown, WI (US); Mohammad N. ElBsat, Milwaukee, WI (US); Michael J. Wenzel, Grafton, WI (US)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 2 days.

(21) Appl. No.: 16/294,433

(22) Filed: Mar. 6, 2019

(65) Prior Publication Data
US 2020/0284458 A1    Sep. 10, 2020

(51) Int. Cl.
*F24F 11/47* (2018.01)
*F24F 11/63* (2018.01)
*F24F 140/60* (2018.01)

(52) U.S. Cl.
CPC .............. *F24F 11/47* (2018.01); *F24F 11/63* (2018.01); *F24F 2140/60* (2018.01); *G05B 2219/31408* (2013.01)

(58) Field of Classification Search
CPC ........ F24F 11/47; F24F 11/63; F24F 2140/60; G06Q 10/20; G06Q 50/06; G06Q 30/0283; G05B 2219/31408
See application file for complete search history.

(56) References Cited

U.S. PATENT DOCUMENTS 4,393,662 A * 7/1983 Dirth .................... F25B 5/02
                                                    165/268
5,040,377 A * 8/1991 Braun ................ F25B 49/027
                                                    165/299
(Continued)

FOREIGN PATENT DOCUMENTS

JP    2002-215760 A    8/2002
JP       3783859 B    6/2006
(Continued)

OTHER PUBLICATIONS

Farzad Pargar, Osmo Kauppila, Jaakko Kujala, Integrated scheduling of preventive maintenance and renewal projects for multi-unit systems with grouping and balancing, Computers & Industrial Engineering, vol. 110, 2017, pp. 43-58 (Year: 2017).*

(Continued)

*Primary Examiner* — Christopher E. Everett
(74) *Attorney, Agent, or Firm* — Foley & Lardner LLP

(57) ABSTRACT

An air conditioner controller for an air conditioner is configured to obtain a first value of a performance value from a predetermined component of the air conditioner, and estimate a total cost. The controller is configured to estimate the total cost including an operation cost and a renewal cost of the air conditioner based on the first value of the performance variable obtained from the predetermined component of the air conditioner and a second value of the performance variable estimated by an operational model of the air conditioner. The total cost is a total cost of operating and renewing the air conditioner for a time period after a time at which the first value of the performance variable is obtained. The controller is configured to output the total cost via a user interface.

18 Claims, 7 Drawing Sheets

(56) References Cited

U.S. PATENT DOCUMENTS

| | | | | |
|---|---|---|---|---|
| 10,359,748 | B2* | 7/2019 | ElBsat | F24F 11/30 |
| 2004/0162811 | A1* | 8/2004 | Wetzer | G06Q 10/06 |
| 2006/0130501 | A1* | 6/2006 | Singh | F25B 49/027 |
| | | | | 62/183 |
| 2007/0005191 | A1* | 1/2007 | Sloup | G05B 17/02 |
| | | | | 700/276 |
| 2010/0107668 | A1* | 5/2010 | Voorhis | F24F 3/153 |
| | | | | 62/176.3 |
| 2010/0306001 | A1* | 12/2010 | Discenzo | G05B 13/024 |
| | | | | 705/7.37 |
| 2013/0282355 | A1* | 10/2013 | Hosking | G06Q 10/109 |
| | | | | 703/21 |
| 2014/0006088 | A1* | 1/2014 | Coleman | G06Q 10/06314 |
| | | | | 705/7.24 |
| 2014/0067132 | A1* | 3/2014 | Macek | F24F 11/30 |
| | | | | 700/276 |
| 2014/0096547 | A1* | 4/2014 | Boehde | F25B 49/027 |
| | | | | 62/89 |
| 2015/0220069 | A1* | 8/2015 | Linehan | G06Q 30/0641 |
| | | | | 700/276 |
| 2016/0148171 | A1* | 5/2016 | Phan | G01M 99/008 |
| | | | | 702/184 |
| 2017/0003667 | A1* | 1/2017 | Nakabayashi | G06Q 10/20 |
| 2017/0083822 | A1* | 3/2017 | Adendorff | G05B 23/0278 |
| 2018/0187913 | A1* | 7/2018 | Kolk | F24F 11/46 |
| 2018/0341255 | A1 | 11/2018 | Turney et al. | |
| 2018/0373234 | A1 | 12/2018 | Khalate et al. | |
| 2019/0017721 | A1* | 1/2019 | Motodani | F24F 11/49 |
| 2019/0066236 | A1 | 2/2019 | Wenzel | |
| 2020/0116375 | A1* | 4/2020 | Heintzelman | F24F 11/61 |
| 2020/0132329 | A1* | 4/2020 | Ito | F24F 11/63 |

FOREIGN PATENT DOCUMENTS

| | | |
|---|---|---|
| JP | 3909817 B2 * | 4/2007 |
| JP | 2015-124987 | 7/2015 |
| JP | 2015-207037 | 11/2015 |

OTHER PUBLICATIONS

U.S. Appl. No. 15/968,187, filed May 1, 2018, Johnson Controls Technology Company.

U.S. Appl. No. 16/034,057, filed Jul. 12, 2018, Johnson Controls Technology Company.

\* cited by examiner

AIR CONDITION MANAGEMENT APPARATUS, SYSTEM, AND METHOD

BACKGROUND

Costs for air conditioning may account for about 40% of building maintenance costs. Therefore, cost savings for air conditioning can highly impact cost savings of building maintenance costs. Some systems may use a technique that reduces energy consumption amounts and operating costs of an air conditioning facility by optimizing setpoint values of at least one air conditioner with respect to blowing air temperature, cooling water temperature of a refrigerator, and cooling water temperature at a cooling tower. Other systems may use a technique that determines an air conditioner system with reduced initial costs and running costs by calculating the initial costs and the running costs based on energy consumption amounts relating to electric loads and thermal loads. There is a need for an air conditioning controller which determines optimal times to provide maintenance and renewal (e.g., replacement) to the air conditioner to minimize costs.

SUMMARY

One implementation of the present disclosure relates to an air conditioner controller for managing an air conditioner, according to some embodiments. In some embodiments, the controller is configured to obtain a first value of a performance value from a predetermined component of the air conditioner, and estimate a total cost. In some embodiments, the controller is configured to estimate the total cost including an operation cost and a renewal cost of the air conditioner based on the first value of the performance variable obtained from the predetermined component of the air conditioner and a second value of the performance variable estimated by an operational model of the air conditioner. In some embodiments, the second value of the performance variable is an ideal or desired value of the performance variable based on an operational model of the air conditioner and/or the predetermined component/device of the air conditioner. In some embodiments, the performance variable is an efficiency value or a value of an operation parameter of the predetermined component/device of the air conditioner. In some embodiments, the predetermined component/device of the air conditioner is a compressor of the air conditioner. In some embodiments, the first value of the performance variable is a measured value obtained from a sensor or other component of the air conditioner and indicates a current operating condition of the air conditioner. In some embodiments, the total cost is a total cost of operating and renewing the air conditioner for a time period after a time at which the first value of the performance variable is obtained. In some embodiments, the controller is configured to output the total cost via a user interface.

In some embodiments, the controller is further configured to estimate a degradation rate of the air conditioner based on the first value of the performance variable and the second value of the performance variable and estimate the total cost based on the degradation rate.

In some embodiments, the controller is further configured to determine or receive multiple values of time between renewal events, estimate multiple values of the total cost based on the values of time between renewal events, and determine a recommended renewal time interval based on the values of the total cost. In some embodiments, the controller is configured to output the recommended renewal time interval via the user interface.

In some embodiments, the controller is further configured to select the value of the multiple values of time between renewal events associated with a minimum value of the values of the total cost as the recommended renewal time interval.

In some embodiments, the total cost includes the operation cost, the renewal cost, and a maintenance cost. In some embodiments, the controller is configured to determine a recommended maintenance time interval by determining or receiving multiple values of time between maintenance events, and estimate multiple combinations of time between maintenance events and time between renewal events based on the values of time between maintenance events and the values of time between renewal events. In some embodiments, the controller is configured to estimate multiple values of the total cost based on the multiple combinations of time between maintenance events and time between renewal events. In some embodiments, the controller is configured to select a minimum value of the multiple values of the total cost, and determine a combination of the time between renewal events and the time between maintenance events associated with the minimum value of the plurality of values of the total cost as the recommended renewal time interval and the recommended maintenance time interval.

In some embodiments, the controller is further configured to estimate a value of the total cost for a predetermined time period.

In some embodiments, the controller is configured to estimate the total cost for a service period of the air conditioner.

In some embodiments, the controller is configured to estimate the total cost for a period set by a user.

Another implementation of the present disclosure relates to an air conditioner system, according to some embodiments. In some embodiments, the air conditioner system includes a controller and an air conditioner configured to provide cooling to a space. In some embodiments, the controller is configured to receive a first value of a performance variable from the air conditioner, and estimate a total cost including an operation cost, a maintenance cost, and a renewal cost of the air conditioner, based on the first value of the performance variable received from the air conditioner and a second value of the performance variable estimated based on an operational model of the air conditioner. In some embodiments, the total cost is a total cost of operating, renewing, and maintaining the air conditioner for a time period after a time at which the first performance value is received. In some embodiments, the controller is configured to generate a control signal of the air conditioner based on the first value of the performance variable and the second value of the performance variable. In some embodiments, the controller is configured to cause the air conditioner to operate in accordance with the control signal. In some embodiments, the controller is configured to output the total cost via a user interface.

In some embodiments, the controller is configured to estimate a degradation rate of the air conditioner based on the first performance value and the second performance value and estimate the operation cost based on the degradation rate.

In some embodiments, the controller is further configured to determine or receive multiple values of time between renewal events, estimate multiple values of the total cost based on the multiple values of time between renewal events, determine a recommended renewal time interval based on the multiple values of the total cost, and output the recommended renewal time interval via the user interface.

In some embodiments, the controller is further configured to determine the recommended renewal time interval by determining a value of the multiple values of time between renewal events corresponding to a minimum value of the multiple values of the total cost as the recommended renewal time interval.

In some embodiments, the controller is configured to determine a recommended maintenance time interval by determining or receiving multiple values of time between maintenance events, estimating multiple combinations of time between maintenance events and time between renewal events based on the multiple values of time between maintenance events and the multiple values of time between renewal events, estimating multiple values of the total cost based on the plurality of combinations of time between maintenance events and time between renewal events, and selecting a minimum value of the multiple values of the total cost. In some embodiments, the controller is configured to determine a combination of the time between renewal events and the time between maintenance events associated with the minimum value of the multiple values of the total cost as the recommended renewal time interval and the recommended maintenance time interval.

In some embodiments, the controller is further configured to estimate a value of the total cost for a predetermined time period.

In some embodiments, the controller is configured to estimate the total cost for a service period of the air conditioner.

In some embodiments, the controller is configured to estimate the total cost for a period set by a user.

In some embodiments, the controller is configured to periodically determine a fan speed of a compressor of the air conditioner system based on a capacity of the air conditioner. In some embodiments, the determined fan speed of the compressor minimizes power consumption of the air conditioner.

Another implementation of the present disclosure relates to a method for managing an air conditioner, according to some embodiments. In some embodiments, the method includes receiving a first value of a performance variable from a predetermined device of the air conditioner, estimating a second value of the performance variable of the predetermined device based on an operational model of the predetermined device, and determining a degradation rate of the air conditioner based on a difference between the first value of the performance variable and the second value of the performance variable. In some embodiments, the method includes determining a control signal for the predetermined device which minimizes the power consumption of the air conditioner, and controlling the predetermined device of the air conditioner to operate according to the control signal. In some embodiments, the method includes determining a total cost of the air conditioner over a time period. In some embodiments, the total cost includes an operation cost, a maintenance cost, and a renewal cost. In some embodiments, the method includes outputting the total cost of the air conditioner over the time period to a user.

In some embodiments, the method includes determining or receiving multiple values of time between renewal events, estimating multiple values of the total cost based on the multiple values of time between renewal events, and determining a recommended renewal time interval based on the multiple values of the total cost. In some embodiments, the method includes outputting the recommended renewal time interval via the user interface.

In some embodiments, the method includes determining or receiving multiple values of time between maintenance events, estimating multiple combinations of time between maintenance events and time between renewal events based on the multiple values of time between maintenance events and the multiple values of time between renewal events, and estimating multiple values of the total cost based on the multiple combinations of time between maintenance events and time between renewal events. In some embodiments, the method includes selecting a minimum value of the multiple values of the total cost, and determining a combination of the time between renewal events and the time between maintenance events associated with the minimum value of the plurality of values of the total cost as the recommended renewal time interval and the recommended maintenance time interval.

DETAILED DESCRIPTION

Technical Problem and Solution

The present disclosure relates to an air condition management apparatus, an air condition management system, an air condition management method/program, according to some embodiments.

An air conditioner may be used for a relatively long-term timeframe and within its service duration, costs may be required for maintenance and renewal (e.g., replacing the air conditioner, replacing a component of the air conditioner, purchasing a new air conditioner, purchasing new components of the air conditioner, etc.). However, other systems do not necessarily take into account the total costs of operating, maintaining, and renewing the air conditioner during its service duration. The present disclosure takes into account total costs of operating, maintaining, and renewing the air conditioner and provides a framework for reducing total costs related to the operation of an air conditioner.

The present disclosure is directed to an air conditioner management controller for an air conditioner, according to some embodiments. The air conditioner management controller includes a data collector which receives, collects, measures, etc., a first output value from a device of the air conditioner, according to some embodiments. In some embodiments, the first output value indicates an operational parameter of one of multiple devices which make up the air conditioner. In some embodiments, the air conditioner management controller includes a cost estimator configured to estimate a total cost of the air conditioner based on the first output value obtained by the data collector and a second output value. In some embodiments, the second output value is estimated based on an operational model of the air conditioner. In some embodiments, the total cost includes operating costs and renewal costs of the air conditioner. In some embodiments, the total cost is a cost for a time after the first output value is obtained, collected, or received by the data collector. In some embodiments, the air conditioner management controller includes an output manager configured to output data/information which indicates the total cost estimated by the cost estimator after the first output value is obtained by the data collector.

According to the present disclosure, a framework for reducing the total costs relating to operation of the air conditioner is provided, according to some embodiments.

Specific embodiments of the present disclosure will now be described with referring to the accompanying drawings. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. The terminology used in the detailed description of the embodiments illustrated in the accompanying drawings is not intended to be limiting of the disclosure.

Air Conditioning System

Figure 1:
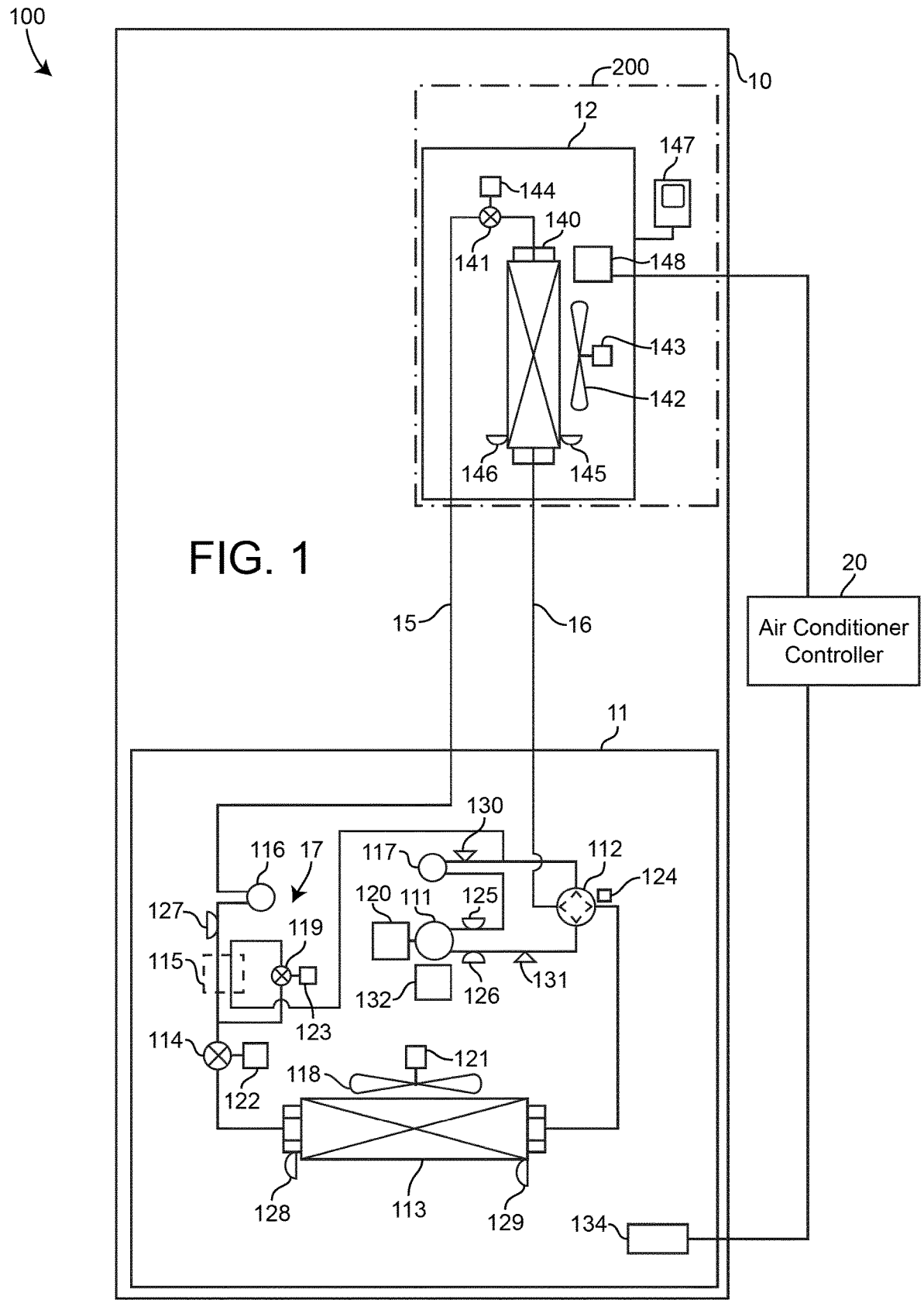
FIG. 1 is a block diagram of an air condition management system, according to some embodiments.

Referring now to FIG. 1, a block diagram of an air condition management system 100 is shown, according to some embodiments. The air condition management system 100 includes an air conditioner 10 and an air conditioner controller 20, according to some embodiments. The air conditioner 10 includes an outdoor unit 11 and an indoor unit 12, according to some embodiments. In some embodiments, the outdoor unit 11 and the indoor unit 12 are connected via connection pipe 15 at a liquid side and connection pipe 16 at a gas side. In some embodiments, the connection between the outdoor unit 11 and the indoor unit 12 via the connection pipe 15 and the connection pipe 16 defines a closed circuit (e.g., a closed fluid circuit). Refrigerant flows through (e.g., circulates) the closed circuit in a refrigeration cycle, according to some embodiments. The indoor unit 12 may be placed in a service location (e.g., in each room). The outdoor unit 11 may be placed outside of a building to which the air conditioner 10 is configured to provide cooling.

The outdoor unit 11 includes a compressor 111, a four-way valve 112, an outdoor heat exchanger 113, an outdoor expansion valve 114, a supercooling heat exchanger 115, a liquid receiver 116, and an accumulator 117, according to some embodiments. The compressor 111, the four-way valve, 112, the outdoor heat exchanger 113, the outdoor expansion valve 114, the supercooling heat exchanger 115, the liquid receiver, and the accumulator 117 may be fluidly connected with pipes as shown in FIG. 1, according to some embodiments. A rotational frequency of the compressor 111 can be adjusted by an inverter, according to some embodiments. In some embodiments, the four-way valve 112 is a reversible valve. In some embodiments, the outdoor heat exchanger 113 is configured to perform heat exchange with outdoor air. In some embodiments, the outdoor expansion valve 114 is configured to use an electronic expansion valve and the like to adjust refrigerant flow amounts of the outdoor heat exchanger 113 therethrough. An outdoor fan 118 may be positioned near the outdoor heat exchanger 113, according to some embodiments. In some embodiments, the outdoor fan 118 is configured to blow air to (e.g., blow air across) the outdoor heat exchanger 113. The outdoor unit 11 may include a bypass circuit 17 for returning the refrigerant to a suction side of the compressor 111 by branching a part of the refrigerant and passing the refrigerant through the supercooling heat exchanger 115. In some embodiments, the bypass circuit includes an outdoor bypass expansion valve 119.

In some embodiments, the outdoor unit 11 includes an inverter compressor frequency operator 120, an outdoor fan blow capacity operator 121, an outdoor expansion valve 114, an outdoor expansion valve operator 122, an outdoor bypass expansion valve operator 123, and a four-way valve operator 124. In some embodiments, the inverter compressor frequency operator 120 is or includes a controller and/or an inverter. In some embodiments, the inverter compressor frequency operator 120 is configured to operate (e.g., adjust, control, etc.) frequency of the compressor 111. In some embodiments, the outdoor fan blow capacity operator 121 is a controller or any other device configured to adjust the outdoor fan 118. In some embodiments, the outdoor fan blow capacity operator 121 is configured to operate (e.g., control, adjust, etc.) a blow capacity of the outdoor fan 118 (e.g., a speed of the outdoor fan 118, a volumetric flow rate of air provided to the outdoor heat exchanger 113, etc.). In some embodiments, the outdoor expansion valve opening operator 122 is or includes an actuator and/or a controller. In some embodiments, the outdoor expansion valve opening operator 122 is configured to operate (e.g., adjust, control, etc.) opening of the outdoor expansion valve 114. In some embodiments, the outdoor bypass expansion valve operator 123 is or includes an actuator and/or a controller. In some embodiments, the outdoor bypass expansion valve operator 123 is configured to operate (e.g., adjust, control, etc.) opening of the outdoor bypass expansion valve 119. In some embodiments, the four-way valve operator 124 is or includes an actuator and/or a controller. In some embodiments, the four-way valve operator 124 is configured to operate (e.g., adjust, control, actuate, etc.) the four-way valve 112.

The outdoor unit 11 may also include multiple temperature/pressure sensors, according to some embodiments. In some embodiments, the outdoor unit 11 includes a compressor suction temperature detector 125, a compressor discharge temperature detector 126, a supercooling heat exchanger outlet temperature detector 127, an outdoor heat exchanger liquid temperature detector 128, an outdoor temperature detector 129, a compressor suction pressure detector 130, and a compressor discharge pressure detector 131. In some embodiments, the compressor suction temperature detector 125 is a sensor configured to measure a temperature of the refrigerant at the suction side of compressor 111. In some embodiments, the compressor discharge temperature detector 126 is a sensor configured to measure a temperature of the refrigerant at the discharge side of compressor 111. In some embodiments, the supercooling heat exchanger outlet temperature detector 127 is a sensor configured to measure a temperature of the supercooled refrigerant passing through (e.g., entering or exiting) the supercooling heat exchanger 115. In some embodiments, the outdoor heat exchanger liquid temperature detector 128 is configured to measure a temperature of liquid exiting the outdoor heat exchanger 113. In some embodiments, the outdoor temperature detector 129 is configured to measure outdoor temperature. In some embodiments, the outdoor temperature detector 129 is configured to measure a temperature of gas or fluid entering the outdoor heat exchanger 113. In some embodiments, the compressor suction pressure detector 130 is configured to measure suction pressure of compressor 111. In some embodiments, the compressor discharge pressure detector 131 is configured to measure discharge pressure of the compressor 111.

The outdoor unit 11 may also include a compressor sensor 132 configured to detect (e.g., measure, sense, receive, etc.) a current value of a performance variable of the compressor 111. In some embodiments, the compressor sensor 132 is a sensor, configured to measure or monitor one or more operating parameters (e.g., load, speed, etc.) of compressor 111. In some embodiments, the compressor sensor 132 is a compressor controller configured to adjust an operation of compressor 111. In some embodiments, the outdoor unit 11 includes a controller 134 configured to control (e.g., operate, adjust, send control signals to, etc.) one or more, or all of the components of the outdoor unit 11. In some embodiments, the controller 134 is a low-level controller configured to receive one or more operating parameters and adjust an operation of one or more or all of the controllable elements of the outdoor unit 11. For example, the controller 134 may be configured to control an operation of any of the inverter compressor frequency operator 120, the outdoor fan blow capacity operator 121, the outdoor expansion valve 114, the outdoor expansion valve operator 122, the outdoor bypass expansion valve operator 123, and the four-way valve operator 124, etc. For example, the controller 134 may be configured to adjust a position (e.g., a configuration) of four-way valve 112

Referring still to FIG. 1, the indoor unit 12 is shown to include an indoor heat exchanger 140, and an indoor expansion valve 141, according to some embodiments. The indoor heat exchanger 140 is configured to perform or facilitate heat exchange with indoor air, according to some embodiments. The indoor expansion valve 141 is configured to adjust refrigerant flow into or out of the indoor heat exchanger 140, according to some embodiments. In some embodiments, the indoor expansion valve 141 is or includes an electronic expansion valve or a similar valve. For example, the indoor expansion valve 141 may include a solenoid valve configured to transition between two or more positions in response to an electrical input. In some embodiments, the indoor expansion valve 141 and the indoor heat exchanger 140 are connected serially by one or more pipes. In some embodiments, an indoor fan 142 is positioned near the indoor heat exchanger 140. In some embodiments, the indoor fan 142 is configured to blow air to the indoor heat exchanger 140. For example, the indoor fan 142 may be configured to blow air over the indoor heat exchanger 140 to facilitate heat exchange.

The indoor unit 12 includes an indoor fan blow capacity operator 143, an indoor expansion valve operator 144, an indoor suction temperature detector 145, and an indoor discharge temperature detector 146, according to some embodiments. In some embodiments, the indoor fan blow capacity operator 143 is an inverter configured to adjust an operation (e.g., a fan speed, a blow capacity, a volumetric flow rate of air driven by the indoor fan 142, etc.) of the indoor fan 142. In some embodiments, the indoor expansion valve operator 144 is an actuator. In some embodiments, the indoor expansion valve operator 144 is configured to control opening of the indoor expansion valve 141. For example, the indoor expansion valve operator 144 may be configured to adjust a position of the indoor expansion valve 141 to open or close the indoor expansion valve 141 or to transition the indoor expansion valve 141 into a partially open position. In some embodiments, the indoor suction temperature detector 145 is a sensor. In some embodiments, the indoor suction temperature detector 145 is configured to detect (e.g., measure) room (service location) temperature. In some embodiments, the indoor discharge temperature detector 146 is a sensor. In some embodiments, the indoor discharge temperature detector 146 is configured to detect (e.g., measure, sense, receive, etc.) discharge air temperature into the room (service location), according to some embodiments. In some embodiments, the indoor unit 12 is positioned at a service location 200. In some embodiments, a service location temperature adjuster (e.g., a remote controller) 147 is disposed in the service location 200. In some embodiments, the service location temperature adjuster 147 is configured to store a temperature setpoint value in the room and is configured to adjust an operation of the air conditioner 10 such that the room temperature meets the desired room temperature. In addition, the indoor unit 12 includes a controller 148, according to some embodiments. In some embodiments, the controller 148 is configured to control (e.g., adjust an operation of) each controllable component of the indoor unit 12. The controller 148 of the indoor unit 12 and the controller 134 of the outdoor unit 11 are both connected to the air conditioner controller 20, according to some embodiments. In some embodiments, the controller 148 of the indoor unit 12 is configured to adjust an operation of any of the indoor fan blow capacity operator 143 and the indoor expansion valve operator 144.

The controller 134 is configured to perform an operational judgment to manage a refrigeration cycle at a refrigerant side of the air conditioner 10 for a defrosting operation, according to some embodiments. In some embodiments, the controller 134 is configured to determine when to start the defrosting operation. In some embodiments, the air conditioner controller 20 conducts judgements at an air side (e.g., what operation is desirable for the service section). For example, the air conditioner controller 20 may determine whether a preheating operation is necessary when starting a heating operation, control of the preheating operation, etc., according to some embodiments. In some embodiments, the air conditioner controller 20 estimates a recommended renewal timing and a recommended maintenance timing of the air conditioner 10 and provides a notification regarding the recommended maintenance timing to a management person, a remote device, a display device, etc. In some embodiments, the recommended renewal timing and the recommended maintenance timing include an optimum renewal timing and an optimum maintenance timing, respectively, that are estimated to maximize cost savings (i.e., minimize costs). The recommended maintenance timing and the recommended renewal timing may be both referred to as recommended timings. In some embodiments, programs, processes, methods, algorithms, etc., that the air conditioner controller 20 uses to determine, obtain, estimate, etc., the recommended timings are referred as recommended timing estimation processes.

Air Conditioner Controller

Figure 2:
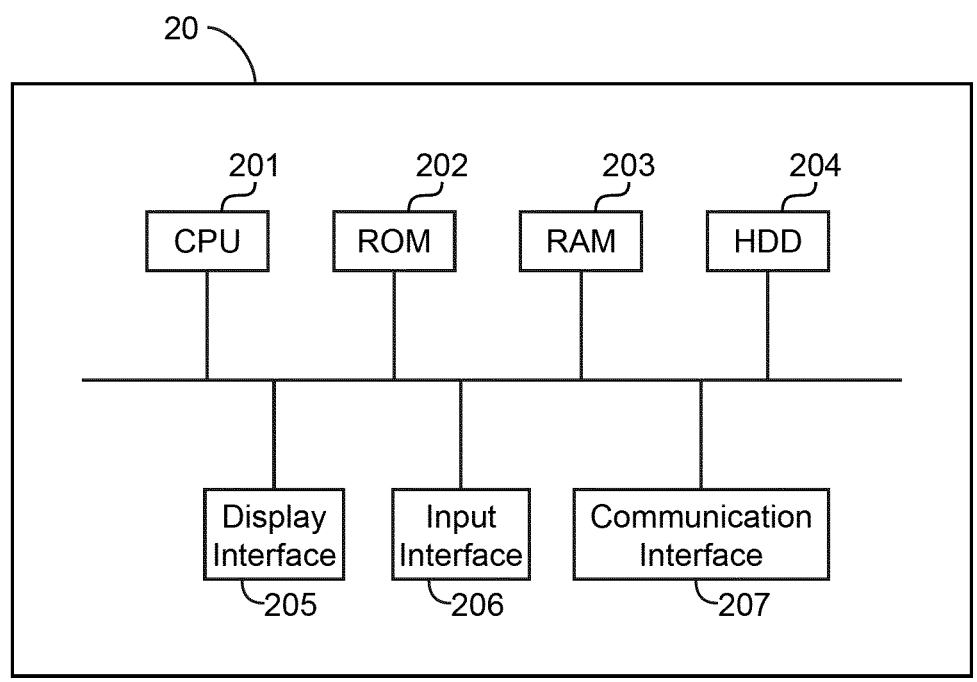
FIG. 2 is a block diagram of hardware architecture of an air condition management apparatus, according to some embodiments.

Referring now to FIG. 2, the air conditioner controller 20 is shown to include CPU 201, ROM 202, RAM 203, HDD 204, a display interface 205, an input interface 206, and a communications interface 207, according to some embodiments. The CPU 201 is configured to execute/perform various processes, programs, algorithms, methods, functions, scripts, etc., by retrieving a control program stored in the ROM 202, according to some embodiments. The RAM 203 may be configured as a temporal storage region for a main memory or a working area and the like of the CPU 201, according to some embodiments. The HDD 204 is configured to store various data, programs, processes, script objects, functions, algorithms, methods, etc., according to some embodiments. The display interface 205 is configured to display various information, notifications, messages, alerts, alarms, data, etc., according to some embodiments. The input interface 206 includes a keyboard and a mouse and is configured to receive various operations from a user, according to some embodiments. The communication interface 207 is configured to communicate with one or more external apparatuses such as the outdoor unit 11 and/or the indoor unit 12, according to some embodiments. In some embodiments, the communications interface 207 is configured to communicably connect the air conditioner controller 20 with the indoor unit 12 and/or the outdoor unit 11. In some embodiments, the communications interface 207 is configured to communicably connect the air conditioner controller 20 with controller 148 and controller 134. In some embodiments, the air conditioner controller 20 is configured to generate control signals for any of the controllable devices of the indoor unit 12 and/or the outdoor unit 11. In some embodiments, the air conditioner controller 20 is configured to receive information from any of the sensors (e.g., the temperature and/or pressure sensors) of the indoor unit 12 and/or the outdoor unit 11.

The functions, programs, methods, processes, control algorithms, etc., of the air conditioner controller 20 detailed herein are performed/implemented by the CPU 201, according to some embodiments. In some embodiments, the CPU 201 retrieves the program stored in the ROM 202 or the HDD 204 and executes the program. In some embodiments, at least one part of the functions, programs, methods, processes, algorithms, etc., of the air conditioner controller 20 may be implemented by multiple CPUs, RAMs, ROMs, and storage devices. In some embodiments, at least a part of the functions, programs, algorithms, scripts, processes, methods, etc., of the air conditioner controller 20 are implemented via a hardware circuit.

Figure 3:
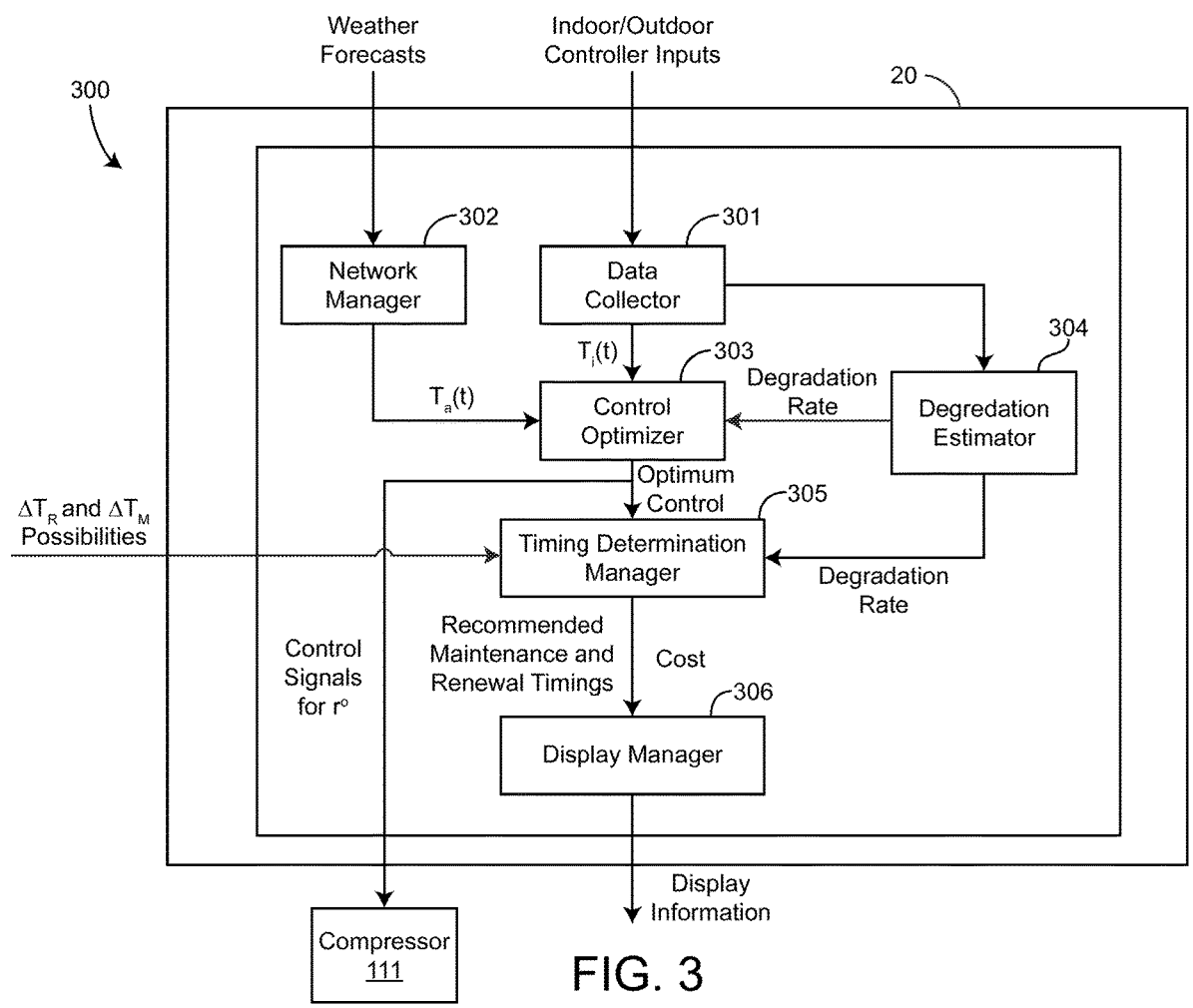
FIG. 3 is a block diagram of one embodiment of a functional architecture of an air condition management apparatus, according to some embodiments.

Referring now to FIG. 3, a block diagram 300 which illustrates the functional architecture of the air conditioner controller 20 is shown, according to some embodiments. In some embodiments, the various components of the block diagram 300 are components of the air conditioner controller 20. In some embodiments, the various components of the block diagram 300 are stored in ROM 202, RAM 203, or HDD 204. In some embodiments, the CPU 201 performs any of the operations of the components of the block diagram 300 described hereinbelow. The air conditioner controller 20 includes a data collector 301, a network manager 302, a control optimizer 303, a degradation estimator 304, a timing determination manager 305, and a display manager 306, according to some embodiments. The data collector 301 is configured to function as an acquisition manager, according to some embodiments. The data collector 301 may receive values of one or more performance variables of any of the components (e.g., sensors, controllers, etc.) of the air conditioner 10. The data collector 301 may receive the one or more values of the one or more performance variables via the communications interface 207 and/or the input interface 206. The degradation estimator 304 is configured to function as a degradation estimation manager to determine a degradation rate of air conditioner 10, according to some embodiments. The timing determination manager 305 is configured to function as a cost estimator, according to some embodiments. In some embodiments, the display manager 306 is configured to function as an output manager.

The data collector 301 is configured to facilitate the exchange of various data/information between the controller 134 of the outdoor unit 11 and the controller 148 of the indoor unit 12, according to some embodiments. For example, in some embodiments, the data collector 301 acquires/receives the current value of the performance variable as detected by the sensor 132 of the compressor 111 in the outdoor unit 11 (e.g., a current value of a performance variable such as efficiency, load, energy consumption, etc.). In some embodiments, the data collector 301 also outputs control signals to adjust an operation of the compressor 111, or any other controllable components, devices, etc. In some embodiments, the data collector 301 is communicably connected to the controller 134 and/or the controller 148 via communication interface 207. In some embodiments, the data collector 301 is communicably connected with the controller 134 and/or the controller 148 via input interface 206.

In some embodiments, the network manager 302 receives instructions and the like in response to user operations. In some embodiments, the network manager 302 receives, for example, information about weather forecasts. In some embodiments, the air conditioner controller 20 is connected to a network such as the INTERNET etc. In some embodiments, the air conditioner controller 20 obtains timely the information about the weather forecasts through the network. In some embodiments, the network manager 302 is communicably connected with the network via input interface 206 and/or communication interface 207.

The control optimizer 303 is configured to determine optimum control for the outdoor unit 11, according to some embodiments. In some embodiments, the control optimizer 303 outputs control signals associated of the optimum control to the outdoor unit 11 to adjust an operation of the outdoor unit 11. The optimum control relating to the compressor 111 is described in greater detail below, according to some embodiments.

First, a room temperature model is assumed as shown in Equation (1) below:

$$C\frac{dT_i(t)}{dt} + K[T_i(t) - T_a(t)] = Q(t) \qquad (1)$$

where t is time (e.g., in seconds), $T_i$ is room temperature (e.g., in degrees Celsius), $T_a$ is an outdoor temperature (e.g., in degrees Celsius), Q is an air conditioning capacity (e.g., in kW), C is a heat capacity in a room (e.g., in kJ/K), and K is a head transmission rate (e.g., in kW/K), according to some embodiments. In some embodiments, the room temperature $T_i$ is generally expressed by a distributed parameter system having a special expanse and described by a partial differentiation equation. In some embodiments, the room temperature is represented using one or more measured data points in an ordinary differential equation. In some embodiments, the room temperature is represented by the suction temperature of the indoor unit. It should be noted that an inner load of the room has been omitted in Equation (1) by assuming that there is no need to distinguish loads inside the room from loads from the outside, according to some embodiments.

In some embodiments, a control regulation function J is used to determine the optimum control, as shown in Equation (2) below:

$$J = \int_0^{t_F} \{m[T_i(t) - T_s]^2 + nW^2(t)\}dt \qquad (2)$$

where $T_s$ is a temperature setpoint (e.g., a desired room temperature), W is electric power consumption of the air conditioner, $t_f$ is control end time, and m and n are weight coefficients. In some embodiments, the control regulation function J is used by control optimizer 303. The control regulation function J of Equation (2) represents the idea that the control is performed so as to lower both a control deviation and power consumption, according to some embodiments. In some embodiments, the control deviation and the power consumption are decreased (e.g., minimized) by minimizing the sum of both squares ($m[T_i(t)-T_s]^2$) and ($nW^2(t)$) for a trade-off system where the control deviation $[T_i(t)-T_s]$ is intended to decrease and the electric power consumption W should increase due to improving responses when starting. In this case, as shown in Equation (3) below, the air conditioning capacity Q and the electric power consumption W are approximated by static linear equations with respect to a compressor rotation rate r:

$$\left.\begin{array}{l} Q(t) = q_A r(t) + q_B \\ W(t) = w_A r(t) + w_B \end{array}\right\} \quad (3)$$

where $q_A$, $q_B$, $w_A$, and $w_B$ are constants which are assumed to be known, according to some embodiments. In some embodiments, the air conditioning capacity of a packaged air conditioner has dynamic characteristics. In some embodiments, the air conditioning capacity also characteristics which, after the air conditioner stabilized, can be approximated by higher order polynomial equations (e.g., quadratic equations) rather than the linear equation shown in Equation (3). However, the linear equation for static characteristics can be adopted in order to avoid generation of the checkpoint upon solving the optimum solution, according to some embodiments.

Equations (1)-(3) have solutions since they become substandard problems in optimization, according to some embodiments. Derivation of the solution by the Bellman dynamic programming method is described in greater detail hereinbelow, according to some embodiments. First, in order to make variables of Equations (1)-(2) as similar as possible, $\Delta T(t)$ is defined as shown in Equation (4) below:

$$\Delta T(t) = T_i(t) - T_s \quad (4)$$

according to some embodiments. Substituting Equations (3) and (4) into Equations (1) and (2) yields Equations (5) and (6) as shown below:

$$\frac{d\Delta T(t)}{dt} = -\frac{K}{C}\Delta T(t) + \frac{1}{C}\{q_A r(t) + q_B\} + \frac{K}{C}\{T_a(t) - T_s\} \quad (5)$$

$$J = \int_0^{t_F}\{m\Delta T^2(t) + n[w_A r(t) + w_B]^2\}dt \quad (6)$$

according to some embodiments.

Equation (6) can be used to determine a minimum cost general purpose function V as shown in Equation (7) below:

$$V(t, \Delta T_t) = \min_{r(s), t \leq s \leq t_F}\left[\int_t^{t_F}\{m\Delta T_s^2 + n[w_A r_s + w_B]^2\}ds\right] \quad (7)$$

according to some embodiments.

Dividing both sides of Equation (7) by $\Delta t$ and then subjecting it to limit operation where $\Delta t \to 0$ results in the Bellman Equation as shown in Equation (8) below:

$$-\frac{\partial V(t, \Delta T_t)}{\partial t} = \min_{r(t)}\left[m\Delta T_t^2 + n[w_A r(t) + w_B]^2 + \left\{-\frac{K}{C}\Delta T_t + \frac{1}{C}[q_A r(t) + q_B] + \frac{K}{C}[T_a(t) - T_s]\right\}\frac{\partial V(t, \Delta T_t)}{\partial \Delta T_t}\right] \quad (8)$$

according to some embodiments. The right side of Equation (8) is subjected to the partial differentiation with respect to the compressor rotation rate r, according to some embodiments. A condition for determining the minimum is shown in Equation (9) below:

$$2n[w_A r(t) + w_B]w_A + \frac{q_A}{C}\frac{\partial V(t, \Delta T_t)}{\partial \Delta T_t} = 0 \quad (9)$$

according to some embodiments. Therefore, r(t) which satisfies Equation (9) is the optimum compressor rate, according to some embodiments. When the optimum compressor rate is represented as $r^o(t)$, Equation (10) is obtained by solving Equation (9) for r(t):

$$r^o(t) = -\frac{1}{2nw_A^2}\left\{\frac{q_A}{C}\frac{\partial V(t, \Delta T_t)}{\partial \Delta T_t} + 2nw_A w_B\right\} \quad (10)$$

according to some embodiments.

Since the right side of the Bellman Equation as shown in Equation (8) can be minimized by Equation (10), the substitution of Equation (10) into Equation (8) and the arrangement thereof results in Equation (11) as shown below:

$$-\frac{\partial V(t, \Delta T_t)}{\partial t} = m\Delta T_t^2 - \frac{1}{4nw_A^2}\frac{q_A}{C^2}\left\{\frac{\partial V(t, \Delta T_t)}{\partial \Delta T_t}\right\}^2 + \left\{-\frac{K}{C}\Delta T_t + D(t)\right\}\frac{\partial V(t, \Delta T_t)}{\partial \Delta T_t} \text{ where:} \quad (11)$$

$$D(t) = -\frac{1}{C}\left[\frac{q_A w_B}{w_A} - q_B - K\{T_a(t) - T_s\}\right]$$

according to some embodiments.

The solution of Equation (11) is assumed as Equation (12) (shown below), using $\Pi(t)$, $\alpha(t)$, and $\beta(t)$:

$$V(t, \Delta T_t) = \Pi\Delta T^2(t) + \alpha(t)\Delta T(t) + \beta(t) \quad (12)$$

according to some embodiments.

The partial differentiation of Equation (12) by $\Delta T$ results in Equation (12) shown below:

$$\frac{\partial V(t, \Delta T_t)}{\partial \Delta T_t} = 2\Pi(t)\Delta T_t + \alpha(t) \quad (13)$$

according to some embodiments.

Substituting Equations (12) and (13) into Equation (11) yields Equation (14) shown below (where • represents time differentiation):

$$\left\{\Pi(t) + m - \frac{1}{nw_A^2}\frac{q_A^2}{C^2}\Pi^2(t) + \left(-\frac{2K}{C}\Pi(t)\right)\right\}\Delta T_t^2 + \qquad (14)$$

$$\left\{\dot{\alpha}(t) - \frac{1}{nw_A^2}\frac{q_A^2}{C^2}\Pi(t)\alpha(t) + 2D\Pi(t)\right\}\Delta T_t +$$

$$\left\{\dot{\beta}(t) - \frac{1}{4nw_A^2}\frac{q_A^2}{C^2}\alpha^2(t) + D\alpha(t)\right\} = 0$$

according to some embodiments.

Considering a steady state solution at the control end time $t_f = \infty$, the steady state solution can be expressed as shown in Equation (15) below:

$$\dot{\Pi}(t) = \dot{\alpha}(t) = \dot{\beta}(t) = 0 \qquad (15)$$

according to some embodiments.

Therefore, when the steady state solution is represented by:

$$\overline{\Pi}, \overline{\alpha}, \overline{\beta}$$

a sufficient condition of Equation (14) becomes:

$$m - \frac{1}{nw_A^2}\frac{q_A^2}{C^2}\overline{\Pi}^2 + \left(-\frac{2K}{C}\overline{\Pi}\right) = 0 \qquad (16)$$

$$-\frac{1}{nw_A^2}\frac{q_A^2}{C^2}\overline{\Pi}\overline{\alpha} + 2D\overline{\Pi} = 0$$

$$-\frac{1}{4nw_A^2}\frac{q_A^2}{C^2}\overline{\alpha}^2 + D\overline{\alpha} - nw_B^2 = 0$$

according to some embodiments.

By solving Equation (16), Equation (17) is obtained:

$$\overline{\Pi} = \frac{-KC + \sqrt{(KC)^2 + \frac{m}{n}\frac{q_A^2}{w_A^2}C^2}}{\frac{q_A^2}{nw_A^2}}, \quad \overline{\alpha} = \frac{2D\overline{\Pi}}{\left(\frac{q_A^2}{nw_A^2 C^2}\overline{\Pi} + \frac{K}{c}\right)} \qquad (17)$$

according to some embodiments. From Equation (17) above, r(t) can be obtained by substituting Equations (17) and (13) into (10), where r(t) is derived as the optimized value r°(t), according to some embodiments. r°(t) is represented by Equation (18) below:

$$r°(t) = -K_1°\{T_i(t) - T_s\} - K_2°\{T_a(t) - T_s\} - v \qquad (18)$$

where $K_1°$ and $K_2°$ are feedback coefficients and v is a control coefficient, according to some embodiments. $K_1°$, $K_2°$, and v are represented by Equation (19), shown below:

$$K_1° = \frac{q_A\overline{\Pi}}{nw_A^2 C}, \qquad (19)$$

$$K_2° = \frac{\overline{\Pi}K}{\frac{q_A^2}{c}\overline{\Pi} + K}, \quad v = \frac{\overline{\Pi}}{\frac{q_A^2}{c}\overline{\Pi} + K}\left(\frac{q_A w_B}{w_A} - q_B\right) - \frac{w_B}{w_A}$$

according to some embodiments.

In the derivation shown above, the optimum control has been explained for the case of an indoor model of Equation (1) for the air conditioning field without considering the degradation of the air conditioner 10, for convenience of description, according to some embodiments. However, the air conditioner 10 will degrade practically and gradually due to the use thereof such that consideration for the degradation must be taken into account, according to some embodiments. By defining the degradation rate as d(t), the indoor model is expressed as shown below:

$$C\frac{dT_i(t)}{dt} + K[T_i(t) - T_a(t)] = d(t)Q(t) \qquad (20)$$

according to some embodiments.

The control optimizer 303 determines the optimum control r°(t) and controls the compressor 111 to operate according to the optimum control r°(t) derived from Equation (18), according to some embodiments. In some embodiments, the optimum control is a value which minimizes an amount of power consumed by the air conditioner 10 and/or the compressor 111. In some embodiments, the air conditioner controller 20 is configured to generate control signals for the air conditioner 10 and/or the compressor 111 to cause the air conditioner 10 and/or the compressor 111 to operate according to the optimum control. In some embodiments, the air conditioner controller 20 operates the compressor 111 and/or the air conditioner 10 according to the optimum control to affect an environmental condition of a space (e.g., a space to which the air conditioner 10 is configured to provide cooling). Furthermore, the control optimizer 303 estimates the heat capacity C and the heat transmission rate K by inputting the air conditioner capacity Q(t) into Equation (20) periodically (e.g., every fifteen minutes) and then updates the optimum control to maintain the optimum control, according to some embodiments. In this way, if the heat capacity C and/or the heat transmission rate K change while the air conditioner 10 is operating, the control optimizer 303 recalculates the optimum control r°(t) for the changed heat capacity C and/or the changed heat transmission rate K, according to some embodiments. The control optimizer 303 obtains the outdoor temperature required to determine the optimum control from the outdoor unit 11 and also the room temperature from the indoor unit 12 through the data collector 301, according to some embodiments. The control optimizer 303 also obtains the degradation rate d(t) from a degradation estimator 304 described in greater detail below, according to some embodiments. Additionally, the control optimizer 303 obtains the information about future weather forecasts through the network manager 302, according to some embodiments. In some embodiments, the information about the weather forecast is used as the outdoor temperature $T_a(t)$.

The degradation estimator 304 estimates the degradation rate r(t) of the outdoor unit 11, according to some embodiments. In some embodiments, the degradation rate is a value determined by a difference from the operational model of the outdoor unit 11. In some embodiments, the operational model is estimated from performance values of the outdoor unit 11, an installation environment, etc. The operational model is assumed to be provided beforehand to the degradation estimator 304, according to some embodiments. In some embodiments, the operational model of the outdoor unit 11 is stored in the ROM 202, the RAM 203, or the HDD 204. The degradation estimator 304 may estimate the degradation rate r(t) of the outdoor unit 11 based on a difference between the current value of the (e.g., measured) performance variable that indicates a current operating condition of the compressor 111 and a current estimated value of the performance variable derived from the operation model, according to some embodiments. The estimated value derived from the operation model may indicate an ideal value of the performance variable under ideal conditions (i.e., without any degradation), whereas the measured value may indicate the actual value of the performance variable. The measured value may differ from the estimated value as a result of degradation. Therefore, the difference between the measured value and the estimated value can be used to estimate an amount of degradation or a degradation rate. In some embodiments, the degradation estimator 304 acquires the current value of the performance variable of the compressor 111 from the outdoor unit 11 through the data collector 301. In some embodiments, the degradation estimator 304 estimates the degradation rate of the outdoor unit 11 based on the estimated current value of the performance variable given by the operational model and the current value of the performance variable (e.g., the measured value) of the compressor 111. In some embodiments, in order to estimate the degradation rate, the degradation estimator 304 uses functions to determine the degradation rate from the difference between the measured value and the estimated value. In some embodiments, the function is assumed to be stored in the HDD 204. In some embodiments, a correspondence table, which associates the difference of the measured current values of the performance variable (s) and the estimated current values of the performance variable(s) with each of the degradation rates, may be stored in the HDD 204. In some embodiments, the degradation estimator 304 may estimate the degradation rate by looking up a degradation rate corresponding to the difference between the measured value and the estimated value of the compressor 111. In some embodiments, the air conditioner controller 20 (e.g., the control optimizer 303) is configured to use the degradation rate to determine control signals for the air conditioner 10. In some embodiments, the control optimizer 303 is configured to receive the degradation rate and/or the difference between the current/measured value of the performance variable and the ideal/estimated value of the performance variable. In some embodiments, the control optimizer 303 is configured to operate the compressor 111 and/or the air conditioner 10 according to the control signal to affect an environmental condition of a space for which the air conditioner 10 is configured to provide cooling. In some embodiments, the control optimizer 303 determines the control signal based on the degradation rate as determined and provided by the degradation estimator 304. In some embodiments, the control optimizer 303 and/or the air conditioner controller 20 use the estimated/ideal value of the performance variable to generate a control signal for the air conditioner 10. In some embodiments, the control optimizer 303 and/or the air conditioner controller 20 use the estimated/ideal value of the performance variable to control an operation of the air conditioner 10 or a component/device of the air conditioner 10 (e.g., the compressor 111) to affect an environmental condition of the space for which the air conditioner 10 is configured to provide cooling.

Example Graphs

Figure 4:
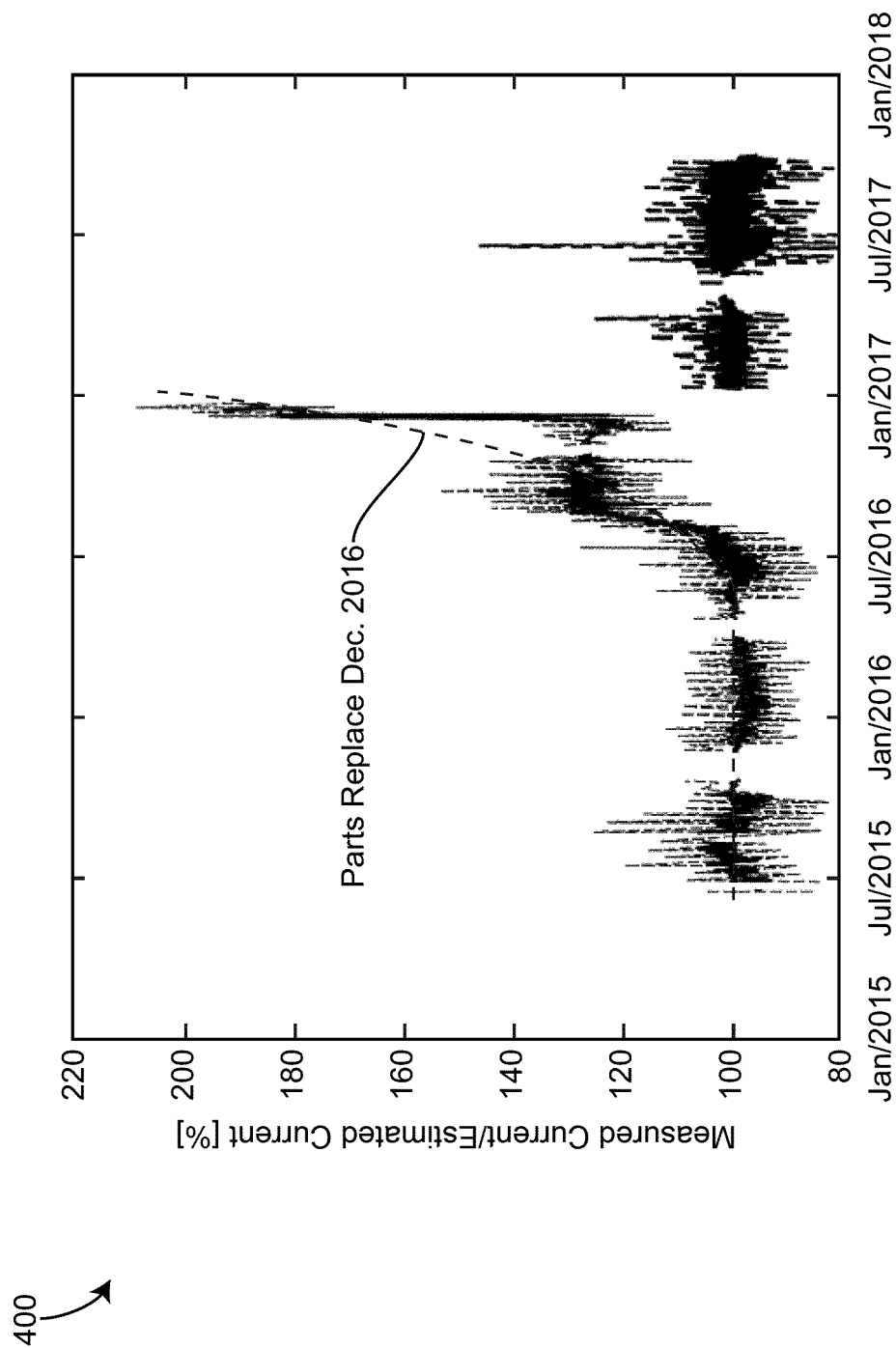
FIG. 4 is a graph of one example showing time dependence of a current value of a compressor, according to some embodiments.

Referring now to FIG. 4, a graph 400 illustrating one example of time dependence of the current value of the performance variable of the compressor 111 is shown, according to some embodiments. The abscissa (X-axis) of the graph 400 indicates years and months, according to some embodiments. The ordinate (Y-axis) of the graph 400 indicates a ratio of the detected/measured/sensed current value of the performance variable (e.g., the actually measured, sensed, received, etc., value of the performance variable) to an estimated value of the current value of the performance variable of the compressor 111 (e.g., an ideal value of the performance variable as determined using an operational model), according to some embodiments. In some embodiments, the estimated value is the value estimated by the operational model. In the example as shown in FIG. 4, it is understood that the ratio of the current value of the performance variable rapidly increases from July in 2016, according to some embodiments. This is caused by the degradation of the compressor 111, according to some embodiments. Since the degradation of the compressor 111 has increased, the ratio of the actual value to the ideal value of the performance variable increases as well. When parts were replaced at December in 2016, the ratio of the current value of the performance variable again returned to around 100%, according to some embodiments. As described above, the current or measured value of the performance variable of the compressor 111 will deviate largely from the estimated value of the performance variable as determined by the operational model due to the degradation, according to some embodiments. In this way, the degradation rate may be estimated based on the current value of the performance variable of compressor 111, according to some embodiments. Additionally, the electric power consumption amount is found from the current value of the performance variable using a power factor so that the operation costs (e.g., cost of electrical energy purchased) can be estimated by the current value of the performance variable, according to some embodiments.

Referring again to FIG. 3, in some embodiments, the degradation estimator 304 estimates the degradation rate of the air conditioner 10 and one or more of the various devices of the air conditioner 10. For example, the degradation estimator 304 may receive a performance variable from any of the various devices, components, actuators, motors, etc., of the air conditioner 10, and compare the actual/measured/current value of the performance variable to an ideal value of the performance variable determined using an appropriate operational model. It should be noted that the output values thereof are not be limited to as described herein. In another example, the degradation estimator 304 may estimate the degradation rate of the air conditioner 10 based on the discharged air temperature from the indoor unit 12 and performance variable values of the indoor heat exchanger 140 (e.g., amount of heat exchange, temperatures of fluid entering and/or leaving the indoor heat exchanger 140, amount of refrigerant passing through the heat exchanger 140, etc.). When a filter disposed in the indoor heat exchanger 140 or placed in front of the indoor heat exchanger 140 becomes clogged, the circulation flow amounts of the air may decrease, according to some embodiments. Therefore, even in the case that the same refrigerant amount is circulated in the indoor heat exchanger 140 under heating, the temperature difference detected will become larger than the temperature difference estimated due to the clogged filter, according to some embodiments. In some embodiments, the temperature difference is the temperature difference between the discharge temperature (detection temperature of the indoor discharge temperature detector 146) and the suction temperature (detected temperature of the indoor suction temperature detector 145). Thus, the degradation rate may be estimated based on the "deviation in the temperature difference" estimated based on the targeted or ideal temperature difference of the indoor heat exchanger 140 with respect to the actual temperature difference of the indoor heat exchanger 140, according to some embodiments. It should be noted that this applies to the case when the refrigerant flowing into the indoor heat exchanger 140 is at a specified value due the rotation rate of the compressor 111 and the opening of the indoor expansion valve 141, according to some embodiments. In the case that the refrigerant flow rate is different or changes, the targeted temperature difference may be modified proportionally to the refrigerant flow rate (e.g., due to changes in the rotation rate of the compressor 111 and/or opening or closing of the indoor expansion valve 141), according to some embodiments. In this case, the degradation estimator 304 obtains the control information (e.g., one or more values of the performance variable, operating setpoints, etc.) and the discharge air temperature of the indoor heat exchanger 140 from the indoor unit 12 through the data collector 301, according to some embodiments.

In some embodiments, the degradation estimator 304 may acquire degradation rates from each output value (e.g., value of a performance variable) of one or more devices which define the air conditioner 10 and may determine the degradation rate of the air conditioner 10 based on these values. As described above, the degradation estimator 304 acquires the output values reflecting operation results of the devices and may estimate the degradation rate based on the output values using particular processes, methods, programs, functions, equations, algorithms, etc., for the estimation.

The timing determination manager 305 estimates the total cost of the outdoor unit 11 based on the operation costs, the renewal costs, and the maintenance costs, according to some embodiments. In some embodiments, the timing determination manager 305 estimates the total cost by further considering the degradation rate. The timing determination manager 305 estimates the total cost $C_T$ using Equation (21) shown below:

$$C_T = \int_0^{t_E} C_{W(t)} dt + \int_0^{t_E} Mk(\Delta T_M) dt + \int_0^{t_E} Rn(\Delta T_R) dt \quad (21)$$

where $C_{W(t)}$ is the operation costs of the compressor 111, according to some embodiments. In some embodiments, $C_{W(t)}$, the total operation cost, is calculated from electronic consumption information of the outdoor fan 118, the indoor fan 142, or the controllers 134 and 148 and the compressor 111. The operation costs of the compressor 111 may depend on the degradation rate. For example, as the degradation rate increases, the compressor 111 may operate more inefficiently, thereby increasing the operation costs of the compressor 111. M is a maintenance cost, R is a renewal cost, k is the number of maintenances, and $\Delta T_M$ is a time between maintenance events (e.g., a time duration between consecutive maintenance events), according to some embodiments. In some embodiments, k is the number of maintenances within the time period $t_E$ (e.g., the service time period). The maintenance period width $\Delta T_M$ can be defined as the time duration between the next maintenance after the former maintenance (e.g., time between consecutively occurring maintenances), according to some embodiments. Likewise, $\Delta T_R$ is time between renewal events (e.g., time between consecutively occurring renewals), according to some embodiments. In some embodiments, n and $\Delta T_R$ are the number of renewals and a time between renewals, respectively. In some embodiments, the renewal period width $\Delta T_R$ is the period duration until the next renewal after the former renewal. In some embodiments, each of the maintenance costs and the renewal costs required for a maintenance event and a renewal event, respectively, are values determined beforehand (e.g., known values for performing maintenance or a renewal). In some embodiments, it is assumed that these values are initially set by the timing determination manager 305 in response to user operations (e.g., user inputs received via input interface 206). In some embodiments, $t_E$ is an end time of a service period of the outdoor unit 10. In some embodiments, the service period is a time duration over which the air conditioner 10 is used in an installation environment thereof (e.g., ten years, five years, an expected lifetime of air conditioner 10, etc.) In some embodiments, it is assumed that the end time $t_E$ of the service period is set in response to the user operations and like. In some embodiments, the end time $t_E$ is stored in memory of the air conditioner controller 20 such as HDD 204. For example the end time $t_E$ may be a lifetime of the outdoor unit 10 and/or indoor unit 11, with t=0 being the time at which the outdoor unit 10 and/or the indoor unit 11 was initially installed. It should be noted that n and k are shown as functions of $\Delta T_R$ and $\Delta T_M$, respectively, according to some embodiments. In some embodiments, $$n = \frac{t_E}{\Delta T_R}$$

for a case when t=0 is assumed to be between consecutively occurring renewal events, and when t=$t_E$ is assumed to be between consecutively occurring renewal events. Likewise, and $$m = \frac{t_E}{\Delta T_M}$$

when t=0 is assumed to be between consecutively occurring maintenance events and when t=$t_E$ is assumed to be between consecutively occurring maintenance events. In some embodiments, $$n = \frac{t_E}{\Delta T_R} + 1$$

for a case when t=0 is assumed to be at a renewal event which is included in the count n, and when t=$t_E$ is assumed to be at a renewal event which is included in the count n. Likewise, $$m = \frac{t_E}{\Delta T_M} + 1$$

when t=0 is assumed to be at a maintenance event which is included in the count m and when t=$t_E$ is assumed to be at a maintenance event which is included in the count m, according to some embodiments. If both t=0 and t=$t_E$ occur at maintenance events and only one of maintenance events at t=0 and t=$t_E$ is included in the count m, then $$m = \frac{t_E}{\Delta T_M},$$

according to some embodiments. If both t=0 and t=$t_E$ occur at maintenance events and neither of the maintenance events at t=0 and t=$t_E$ are included in the count m, then $$m = \frac{t_E}{\Delta T_M} - 1,$$

according to some embodiments. Likewise, if both t=0 and t=$t_E$ occur at renewal events and only one of renewal events at t=0 and t=$t_E$ is included in the count n, then $$n = \frac{t_E}{\Delta T_R},$$

according to some embodiments. If both t=0 and t=$t_E$ occur at renewal events and neither of the renewal events at t=0 and t=$t_E$ are included in the count n, then $$n = \frac{t_E}{\Delta T_R} - 1,$$

according to some embodiments.

Equation (21) has been presented as an integral form for a continuous time interval for illustrative and explanatory purposes, according to some embodiments. However, in the case when the period width for determining the costs is long and when the cost is determined at every time step, the integration part may be replaced by the sum of products ($\Sigma$), and similar handlings may also be adopted.

The first term, the second term, and the third term in the right side of Equation (21) correspond to the total operation cost, the total maintenance cost, and the total renewal cost, respectively (e.g., total across time $t_E$), according to some embodiments. In some embodiments, the total operation cost is the total value of the operation costs required within the service period. In some embodiments, the total maintenance cost is the total value of the maintenance costs required within the service period. In some embodiments, the total maintenance cost is obtained by the maintenance period width and the number of the maintenances. For example, in the case that two maintenances have been made within the service period, the value is calculated by multiplying the maintenance cost per one time by the number of maintenances, i.e., two times, and this value becomes the maintenance cost within the service period, according to some embodiments. In some embodiments, the total renewal cost is the total value of the renewal costs required within the service period similar to the total maintenance cost and may be calculated from the renewal period width and the number of renewals. In some embodiments, timing determination manager 305 calculates the total cost $C_T$ for multiple combinations of a variety of possibilities for $\Delta T_M$ and $\Delta T_E$. In some embodiments, timing determination manager 305 may determine a first set of possible values $S_R$ of $\Delta T_R$ and a second set of possible values $S_M$ of $\Delta T_M$. Timing determination manager 305 uses $S_R$ and $S_M$ to determine a set $S_{R,M}$ all possible combinations of the elements of $S_R$ and $S_M$, according to some embodiments. In some embodiments, $S_{R,M} = S_R \times S_M = \{(S_r, S_m) | S_r \in S_R \text{ and } s_m \in S_M\}$. For example, assuming units of years, if $S_R = \{1, 2, 3\}$ and $S_M = \{0.25, 0.5, 1\}$, then $S_{R,M} = \{(1, 0.25), (1, 0.5), (1, 1), (2, 0.25), (2, 0.5), (2, 1), (3, 0.25), (3, 0.5), (3, 1)\}$. The set $S_{RN}$ can be input into Equation (21) to determine a value of $C_T$ for each element of the set $S_{R,M}$ to determine a cost associated with each combination of $\Delta T_R$ and $\Delta T_M$ as contained in $S_R$ and $S_M$. The minimum value of the multiple values of $C_T$ can then be selected by timing determination manager 305 and the associated values of $\Delta T_R$ and $\Delta T_M$ are output as the recommended timing intervals.

The operation cost, the total maintenance cost, and the total renewal cost shown in Equation (21) are explained in greater detail hereinbelow, according to some embodiments. The operation cost is determined based on the degradation rate, according to some embodiments. In some embodiments, the maintenance timing and the renewal timing are also values determined based on the degradation rate. In some embodiments, the operation cost may vary based on the maintenance timing and the renewal timing. In some embodiments, the operation cost, the total maintenance cost and the total renewal cost within the service period provided by the first term, the second term, and the third term in the right member of Equation (21) are values that depend on the degradation rate and also vary based on each other. In some embodiments, the degradation rate estimated by the degradation estimator 304 is reflected in the operation cost, the total maintenance cost, and the total renewal cost, after the current value of the performance variable of the compressor 111 has been acquired. In some embodiments, the operation cost may be estimated from the current value of the performance variable (e.g., a current performance variable value of the compressor 111 or any other component of the air conditioner 10). For example, the operation cost may be estimated based on the degradation rate which is estimated based on the difference between the current value of the performance variable (e.g., a measured value) and the ideal value of the performance variable (e.g., as determined by an operational model). In some embodiments, the timing determination manager 305 determines the maintenance timing and the renewal timing that minimize the total cost within the service period as the recommended maintenance timing and the recommended renewal timing, respectively.

Figure 5:
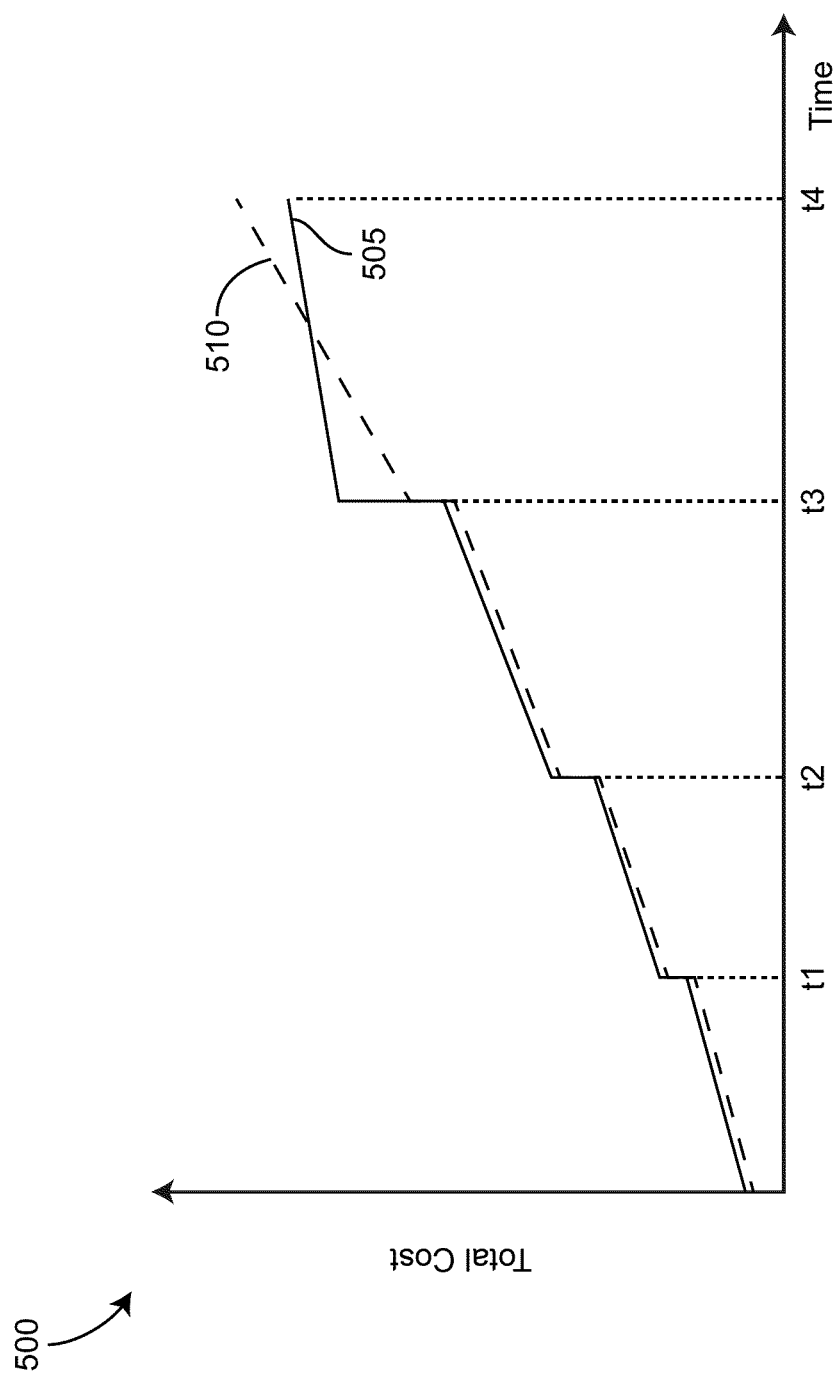
FIG. 5 is a graph of time dependence of the total costs of an air conditioning system, according to some embodiments.

Referring now to FIG. 5, processes, programs, functions, methods, etc., for determining the recommended timings are described in greater detail, according to some embodiments. FIG. 5 illustrates a graph 500 demonstrating total cost of the air conditioner 10 with respect to time, according to some embodiments. An abscissa (X-axis) of the graph 500 represents the time and an ordinate (Y-axis) represents the total cost, according to some embodiments. In some embodiments, solid line 505 of graph 500 illustrates the total cost when the renewal is made, and broken line 510 shows the total cost when the renewal is not made. The slope of each line 505 and 510 indicates the cost of operating the air conditioner 10 per unit time, which is a function of the efficiency of the air conditioner 10 and depends on the degradation of the air conditioner 10. In both cases, the maintenances are made at the timings $t_1$ and $t_2$ and the maintenance costs are incurred, according to some embodiments. In some embodiments, although the maintenance is made, the initial condition cannot be recovered such that slope of each line (e.g., an increase rate of the operation cost) gradually increases. However, the increased rate of the operation cost in the case that the maintenance has been made is less than the case when the maintenance has not been made as shown, according to some embodiments. In other words, performing maintenance may not completely restore the air conditioner 10 to a new condition, but it may cause the air conditioner 10 to operate more efficiently than if maintenance had not been performed.

In the example illustrated by the solid line 505, the renewal is made at $t_3$, according to some embodiments. As described above, by making the renewal, even though the renewal cost is incurred, the increased rate of the operation cost thereafter is lower than compared to the case that the renewal has not been made, according to some embodiments. In addition, while not shown in graph 500, if none of the maintenance and the renewal are made at all, the total cost becomes larger when compared to the case that the maintenance and the renewal are made, according to some embodiments. This is caused by enlargement in the increase rate of the operation cost in the case that the maintenance and the renewal are not made when compared to the case that the maintenance and the renewal are made as shown at time $t_4$, according to some embodiments.

As described above, the total cost within the service period may vary due to the maintenance timing and the renewal timing, according to some embodiments. From the viewpoint of cost saving, it is desirable to minimize the total cost within the service period, according to some embodiments. Thus, in some embodiments, the timing determination manager 305 has been implemented such that the maintenance timing and the renewal timing that minimize the total cost are determined as the recommended maintenance timing and the recommended renewal timing, respectively.

In some embodiments, the timing determination manager 305 determines combinations of values including the number of maintenances, the maintenance period width, the number of renewals and the renewal period width, and then calculates $C_T$ for each combination. In some embodiments, the timing determination manager 305 then determines (e.g., selects) the minimum value from two or more of the total cost values $C_T$ obtained, and also specifies the maintenance period width and the renewal period width under the condition which provide the minimum $C_T$ value (e.g., the maintenance period width and the renewal period with associated with the selected/determined $C_T$). In some embodiments, the timing determination manager 305 determines the maintenance timing and the renewal timing within each of the maintenance period width and the renewal period width and selects them as the recommended maintenance timing and the recommended renewal timing, respectively.

Air Condition Management Apparatus Processes

Figure 6:
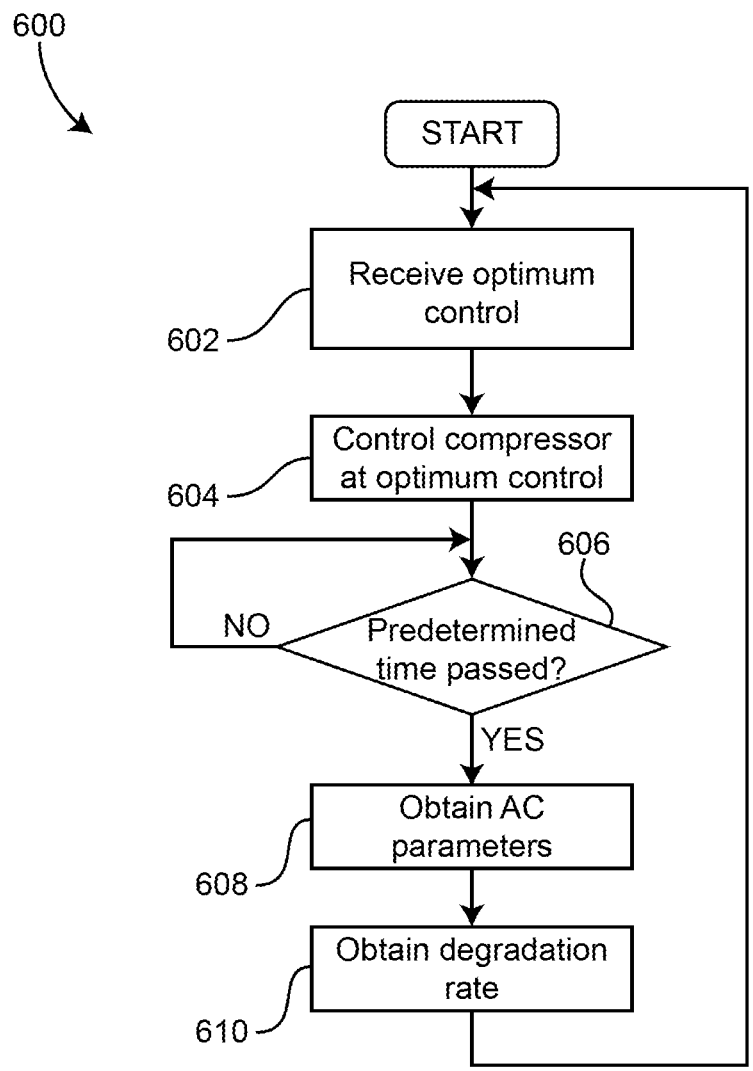
FIG. 6 a flowchart illustrating one example of a process to determine optimum control of an air conditioner, according to some embodiments.

Referring now to FIG. 6, flowchart 600 illustrates a process (e.g., a method) used by the air conditioner controller 20, according to some embodiments. In step 602, the control optimizer 303 obtains the rotation ratio used for the aforementioned optimum control, according to some embodiments. Next, in step 604, the control optimizer 303 outputs an operation instruction and/or a control signal so as to control the operation of the compressor 111 according to the optimum control, according to some embodiments. Next, the control optimizer 303 waits until a predetermined period has passed, and if the predetermined period has passed (step 606, YES), the process proceeds to step 608, according to some embodiments. In step 608, the control optimizer 303 obtains parameters of the air conditioning field such as the heat capacity C and the heat transmission rate K from the compressor 111, according to some embodiments. Next, in step 610, the control optimizer 303 obtains the degradation rate from the degradation estimator 304, according to some embodiments. Then, the control optimizer 303 makes the processing revert to step 602 again and specifies again the optimum control using the parameters obtained in step 608 and step 610, according to some embodiments. The control optimizer 303 repeats steps 602-610 while the compressor 111 is working/operating, according to some embodiments. Thereby, the compressor 111 may perform according the optimum control, according to some embodiments.

Figure 7:
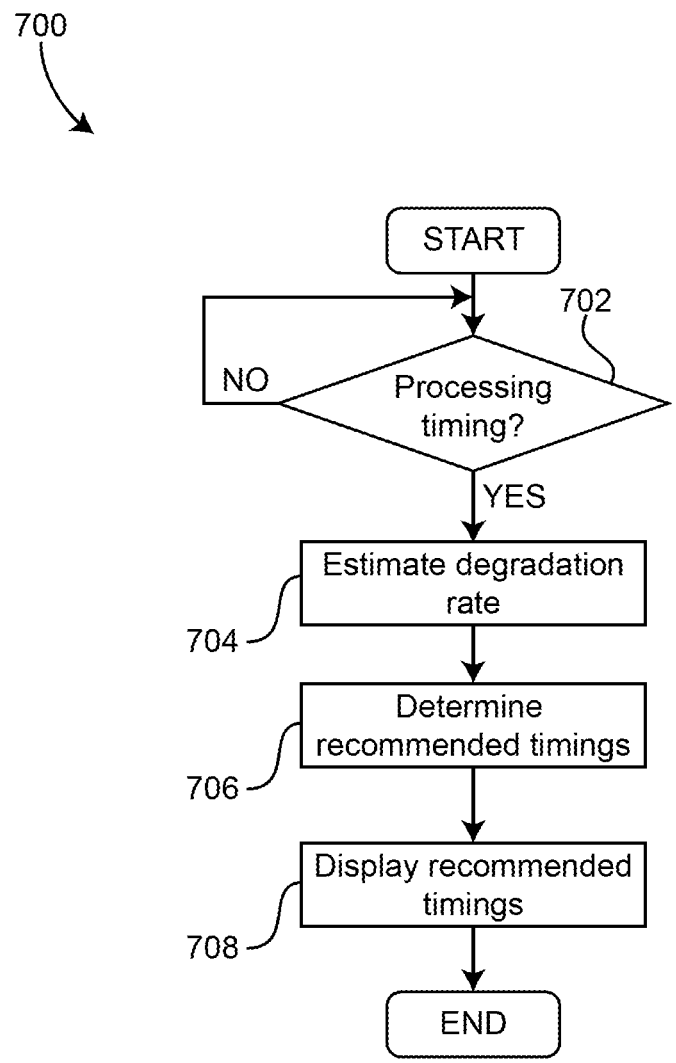
FIG. 7 is a flowchart illustrating one example of a process to determine recommended timings, according to some embodiments.

FIG. 7 illustrates a flowchart 700 of recommended timing notice processes performed by the air conditioner controller 20, according to some embodiments. In some embodiments, the process as illustrated by the flowchart 700 is performed by degradation estimator 304. In step 702, the timing determination manager 305 determines whether or not the processing timing has come (e.g., if it is time to determine the recommended timings), according to some embodiments. The recommended timing notice processes are assumed to be performed periodically (e.g., or every six months, etc.), and the execution timing thereof is also assumed to be set in the timing determination manager 305, according to some embodiments. In some embodiments, step 702 includes determining if a predetermined amount of time since a previous determination of the recommended timings has passed (e.g., six months). Processing timing may be determined optionally, according to some embodiments. In some embodiments, the duration between when recommended timings are determined is non-constant. Furthermore, in some embodiments, the air conditioner controller 20 may execute the recommended timing notice process in the case that the air conditioner controller 20 receives a start instruction (e.g., received from a user via input interface 206 and/or communication interface 207), according to some embodiments.

The timing determination manager 305 advances to step 704 if it determines that the processing timing has come (step 706, YES), according to some embodiments. In step 704, the timing determination manager 305 instructs the degradation estimator 304 to determine the degradation rate estimation, according to some embodiments. In response to this, the degradation estimator 304 acquires the current value of the performance variable of the compressor 111 through the communication interface 207 and estimates the degradation rate of the air conditioner 10 based on the current value of the performance variable of the compressor 111.

Next, in step 706, the timing determination manager 305 obtains the degradation rate d(t) from the degradation estimator 304 and obtains the maintenance timing and the renewal timing that minimize the total cost $C_T$ of Equation (21), according to some embodiments. In some embodiments, the maintenance timing and the renewal timing which minimize the total cost $C_T$ are the recommended maintenance timing and the recommended renewal timing, respectively. Next, in step 708, the display manager 306 controls the display interface 205 to display the recommended maintenance timing and the recommended renewal timing, according to some embodiments. In some embodiments, the recommended timing notice processes are terminated in response to determining the recommended timings. The display manager 306 may display the total cost $C_T$ at each timing obtained in step 708 together with the recommended maintenance timing and the recommended renewal timing, according to some embodiments. In some embodiments, the display manager 306 causes display interface 205 to display the total cost $C_T$ in place of the recommended maintenance timing and the recommended renewal timing, according to some embodiments. In some embodiments, displaying the total cost $C_T$ facilitates a user determining the renewal timing by considering a budget and the total cost $C_T$ within each timing.

As described above, the air conditioner controller 20 may obtain the recommended maintenance timing and the recommended renewal timing that minimize the total cost within the service period of the air conditioner 10, according to some embodiments. The air conditioner controller 20 may further notify a management person by displaying these timings, according to some embodiments. The management person can schedule the operation while lowering the total cost of the air conditioner 10 for the life of the air conditioner 10 based on the provided the information, according to some embodiments.

Since the air conditioner 10 degrades gradually as it operates, the operation cost varies (e.g., increases) with respect to the degradation, according to some embodiments. Furthermore, due to the degradation, even though the maintenance and the renewal of the air conditioning system are necessary in the long-time basis, the timings of the maintenance and the renewal have been conventionally determined depending on frequency of malfunctions or depending on sensuous judgements for cooling or heating, according to some embodiments. However, the long-term air conditioner costs change depending on the timings when the maintenance and the renewal are made such that it is necessary to determine the timings for the maintenance and the renewal in the viewpoint for cost savings, according to some embodiments. Advantageously, the maintenance and renewal of the air conditioner 10 can be performed in order to maximize cost savings as opposed to simply performing maintenance and/or renewal when required by the air conditioner 10.

Example Modifications

The air condition management system 100 is implemented such that the air condition management system 100 estimates the long-term total cost that takes into account the maintenance costs and the renewal costs, according to some embodiments. In some embodiments, the maintenance timing and the renewal timing which lower the total costs are referred to as the optimum maintenance timing and the renewal timing. Therefore, the total costs over the service period may be reduced by performing the maintenance and/or the renewal at optimal times, according to some embodiments. Furthermore, the air condition management system 100 can determine optimum operation of the air conditioner 10 such that waste is minimized and the operation costs are reduced. Specifically, the air conditioner controller 20 can provide a framework for reducing the total costs relating to the operation of the air conditioner 10, according to some embodiments.

A first modification example of the air condition management system 100 is now described, according to some embodiments. It should be noted that the air conditioner controller 20 may merely notify the recommended timings to the management person and the like, and particular processes and methods described herein should not be understood as limiting. As another example, if the air conditioner controller 20 is connected to an information processing device, controller, server, remote device, etc., used by the management person through the network, the recommended timings may be output to the information processing device used by the management person and the like, according to some embodiments. Furthermore, in the case that the air conditioner controller 20 is controlled under a management by a building managing apparatus (e.g., a building management system, a building management controller, etc.), the recommended timings may be sent to the building management apparatus and the building management apparatus may display the timing or timings on the display part thereof.

The second modification example is now described, according to some embodiments. It should be understood that the apparatus/device which executes the recommended timing notice processes is not necessarily limited to the air conditioner controller 20 (or more specifically, the timing determination manager 305) as described above, according to some embodiments. As another example, in the case that the air conditioner controller 20 is controlled under the management by the building managing apparatus as described above, the building management apparatus may execute a part of the processes performed by the timing determination manager 305 to determine the recommended timings. As described above, the recommended timing notice processes may be determined by cooperation of each apparatus in the system including a plurality of apparatuses. In addition, as another example, the recommended timing notice processes or any processes of the timing determination manager 305 may be executed in a cloud system implemented by one or more apparatuses located on the network. Furthermore, the program or process used by timing determination manager 305 to determine the recommended timings may be installed to the system and/or a controller such as the air conditioner controller 20 through the network or be retrieved from a recording medium. In addition, the computer of the system and/or the apparatus may retrieve and execute the program.

The third modification example is now described, according to some embodiments. In this embodiment, although the air conditioner controller 20 has used the end time of the service period of the air conditioner 10 as $t_E$ to determine the total cost $C_T$ based on the recommended timings using Equation (21), $t_E$ may be an optional value. For example, a fixed value of the air conditioner controller 20 may be used, independently from the service period of the air conditioner 10. In another example, values of $t_E$ may set based on a user input from a management person. Thereby, even in the case that the service period (e.g., the lifetime of the air conditioner 10) is not fixed, the air conditioner controller 20 may be notified of approximate recommended timings.

The fourth modification example is now described, according to some embodiments. In this modification, the air conditioner controller 20 obtains the maintenance timing and the renewal timing such that the total cost is minimized using Equation (21). However, the recommended timings may be merely determined based on the total cost $C_T$, and the particular processes therefore should not be limited to the embodiments described above. For example, the air conditioner controller 20 may determine the renewal timing which makes the total cost less than a threshold as opposed to a minimum value and may determine the fastest recommended renewal timing as the recommended renewal timing. Also, for example, the air conditioner controller 20 may obtain the renewal timing making the total cost less than a threshold and may determine the latest recommended renewal timing as the recommended renewal timing.

The fifth modification example is now described, according to some embodiments. In the operation of the air conditioner 10, it is contemplated that only the maintenance is scheduled without making the renewal, according to some embodiments. In some embodiments, the maintenance timing is optimized without taking into account the renewal of the air conditioner 10. In such a case, the timing determination manager 305 may determine the recommended maintenance timing by estimating the total cost $C_{T1}$ such as shown in Equation (22) below for each of a plurality of the maintenance periods. Here, Equation (22) corresponds to Equation (21) but omits the third term of the right member of Equation (21), according to some embodiments. That is to say, the timing determination manager 305 determines the recommended maintenance timing based on the total cost including the operation cost and the maintenance cost but excludes the renewal cost, according to some embodiments.

$$C_{T1} = \int_0^{t_E} C_{W(t)} dt + \int_0^{t_E} Mk(T_M) dt \qquad (22)$$

Furthermore, in the operation of the air conditioner 10, it is contemplated that only the renewal is scheduled without making the maintenance, according to some embodiments. In such a case, the air conditioner controller 20 may determine the recommended maintenance timing by estimating the total cost $C_{T2}$ such as shown in Equation (23) for each of the renewal periods. Here, Equation (23) corresponds to Equation (21) but omits the second term of the right member of Equation (21), according to some embodiments. That is to say, the timing determination manager 305 determines the recommended renewal timing based on the total cost including the operation cost and the renewal cost but excludes the maintenance costs, according to some embodiments.

$$C_{T2} = \int_0^{tE} C_{W(t)} dt + \int_0^{tE} Rn(T_R) dt \quad (23)$$

In some embodiments, the display interface 205 displays the total costs $C_{T1}$ and $C_{T2}$ obtained by Equation (22) and/or Equation (23) as described above.

The sixth modification example is now described, according to some embodiments. In this modification, the timing determination manager 305 has been implemented to obtain the minimum value of $C_T$ by inputting possible values of the number of maintenances, the maintenance period width, the number of renewals and the renewal period width into Equation (21). Processes for obtaining the minimum vale of $C_T$ should not be limited to the examples described above, according to some embodiments. As another example, the timing determination manager 305 first obtains the recommended timing for minimizing the total cost $C_{T1}$ by only considering the maintenance costs in Equation (22) to obtain the second term of the right member of Equation (21), according to some embodiments. In addition, the timing determination manager 305 may next determine the optimum renewal timing for minimizing the total cost $C_{T2}$ by only considering the renewal costs in Equation (23) to obtain the $\int_0^{tE} Rn(T_R) dt$ term of Equation (21). Thereby, the processing requirements of the air conditioner controller 20 may be reduced.

The seventh modification example is now described, according to some embodiments. In this modification, the timing determination manager 305 calculates the total cost $C_T$ for each of a plurality of combinations of possible values of the number of maintenances and the number of the renewals in Equation (21). However, the timing determination manager 305 may merely calculate the total cost $C_T$ for at least one combination. In this case, the display manager 306 may further display the total cost $C_T$ corresponding to the one combination. Thereby, the user may determine whether or not the timing used for the calculation (maintenance timing and renewal timing) is appropriate from a relation between the budget and the total cost.

Configuration of Exemplary Embodiments

As described above, according to each embodiment described hereinbefore, the framework for reducing the total costs relating to operation of the air conditioner can be provided. The data collector 301, the degradation estimator 304, the timing determination manager 305, the display manager 306 as well as other functional parts of the present embodiment are not limited to embodiments literary and explicitly described herein. The functional parts of the present disclosure may be any architecture, configuration, and/or combination that may be implemented in a localized device or may be implemented among a plurality of devices or functional parts so long as such architecture and the like provides the functions corresponding to each part.

As set forth so far, preferred embodiments of the present disclosure have been described. However, the present disclosure should not be limited to the particular embodiments, and various modifications and alternations may be made by those having ordinary skill in the art without departing scope of the present disclosure and the true scope should be determined only by appended claims.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An air conditioner controller for managing an air conditioner, the controller configured to:
obtain a first value of a performance variable from a predetermined component of the air conditioner;

estimate a degradation rate of the air conditioner, based on a difference between the first value of the performance variable obtained from the predetermined component of the air conditioner and a second value of the performance variable estimated by an operational model of the air conditioner that models operation of the air conditioner under ideal conditions without degradation;

estimate a total cost including an operation cost and a renewal cost, wherein the total cost is a total cost of operating and renewing the air conditioner for a time period after a time at which the first value of the performance variable is obtained and at least one of the operation cost or the renewal cost is based on the degradation rate; and output the total cost via a user interface.

2. The air conditioner controller of claim 1, further configured to:

determine or receive a plurality of values of time between renewal events;

estimate a plurality of values of the total cost, based on the plurality of values of time between renewal events;

determine a recommended renewal time interval based on the plurality of values of the total cost; and output the recommended renewal time interval via the user interface.

3. The air conditioner controller of claim 2, further configured to select a value of the plurality of values of time between renewal events associated with a minimum value of the plurality of values of the total cost as the recommended renewal time interval.

4. The air conditioner controller of claim 2, wherein the total cost includes the operation cost, the renewal cost, and a maintenance cost, and wherein the controller is configured to determine a recommended maintenance time interval by:

determining or receiving a plurality of values of time between maintenance events;

estimating a plurality of combinations of time between maintenance events and time between renewal events based on the plurality of values of time between maintenance events and the plurality of values of time between renewal events;

estimating a plurality of values of the total cost based on the plurality of combinations of time between maintenance events and time between renewal events;

selecting a minimum value of the plurality of values of the total cost; and determining a combination of the time between renewal events and the time between maintenance events associated with the minimum value of the plurality of values of the total cost as the recommended renewal time interval and the recommended maintenance time interval.

5. The air conditioner controller of claim 1, further configured to estimate a value of the total cost for a predetermined time period.

6. The air conditioner controller of claim 5, wherein the controller is configured to estimate the total cost for a service period of the air conditioner.

7. The air conditioner controller of claim 1, wherein the controller is configured to estimate the total cost for a period set by a user.

8. An air conditioner system comprising a controller and an air conditioner configured to provide cooling to a space, the controller configured to:

obtain a first value of a performance variable from the air conditioner;

estimate a degradation rate of the air conditioner, based on a difference between the first value of the performance variable received from the air conditioner and a second value of the performance variable estimated based on an operational model of the air conditioner that models operation of the air conditioner under ideal conditions without degradation;

estimate a total cost including an operation cost and a renewal cost, wherein the total cost is a total cost of operating, renewing, and maintaining the air conditioner for a time period after a time at which the first value of the performance variable is received and at least one of the operation cost or the renewal cost is based on the degradation rate;

generate a control signal of the air conditioner based on the first value of the performance variable and the second value of the performance variable;

cause the air conditioner to operate in accordance with the control signal; and output the total cost via a user interface.

9. The air conditioner system of claim 8, wherein the controller is further configured to:

determine or receive a plurality of values of time between renewal events;

estimate a plurality of values of the total cost based on the plurality of values of time between renewal events;

determine a recommended renewal time interval based on the plurality of values of the total cost; and output the recommended renewal time interval via the user interface.

10. The air conditioner system of claim 9, wherein the controller is further configured to determine the recommended renewal time interval by determining a value of the plurality of values of time between renewal events corresponding to a minimum value of the plurality of values of the total cost as the recommended renewal time interval.

11. The air conditioner system of claim 9, wherein the controller is configured to determine a recommended maintenance time interval by:

determining or receiving a plurality of values of time between maintenance events;

estimating a plurality of combinations of time between maintenance events and time between renewal events based on the plurality of values of time between maintenance events and the plurality of values of time between renewal events;

estimating a plurality of values of the total cost based on the plurality of combinations of time between maintenance events and time between renewal events;

selecting a minimum value of the plurality of values of the total cost; and determining a combination of the time between renewal events and the time between maintenance events associated with the minimum value of the plurality of values of the total cost as the recommended renewal time interval and the recommended maintenance time interval.

12. The air conditioner system of claim 8, wherein the controller is further configured to estimate a value of the total cost for a predetermined time period.

13. The air conditioner system of claim 12, wherein the controller is configured to estimate the total cost for a service period of the air conditioner.

14. The air conditioner system of claim 8, wherein the controller is configured to estimate the total cost for a period set by a user.

15. The air conditioner system of claim 8, wherein the controller is configured to periodically determine a fan speed of a compressor of the air conditioner system based on a capacity of the air conditioner, wherein the determined fan speed of the compressor minimizes power consumption of the air conditioner.

16. A method for managing an air conditioner, the method comprising:
obtaining a first value of a performance variable from a predetermined device of the air conditioner;
estimating a second value of the performance variable of the predetermined device based on an operational model of the predetermined device that models operation of the air conditioner under ideal conditions without degradation;
determining a degradation rate of the air conditioner based on a difference between the first value of the performance variable and the second value of the performance variable;
determining a control signal for the predetermined device which minimizes power consumption of the air conditioner;
controlling the predetermined device of the air conditioner to operate according to the control signal;
determining a total cost including an operation cost and a renewal cost of the air conditioner over a time period, wherein the total cost is a total cost of operating, renewing, and maintaining the air conditioner for a time period after a time at which the first value of the performance variable is obtained and at least one of the operation cost or the renewal cost is based on the degradation rate; and
outputting the total cost of the air conditioner over the time period to a user.

17. The method claim 16, further comprising:
determining or receive a plurality of values of time between renewal events;
estimating a plurality of values of the total cost based on the plurality of values of time between renewal events;
determining a recommended renewal time interval based on the plurality of values of the total cost; and
outputting the recommended renewal time interval via a user interface.

18. The method of claim 17, further comprising:
determining or receiving a plurality of values of time between maintenance events;
estimating a plurality of combinations of time between maintenance events and time between renewal events based on the plurality of values of time between maintenance events and the plurality of values of time between renewal events;
estimating a plurality of values of the total cost based on the plurality of combinations of time between maintenance events and time between renewal events;
selecting a minimum value of the plurality of values of the total cost; and
determining a combination of the time between renewal events and the time between maintenance events associated with the minimum value of the plurality of values of the total cost as the recommended renewal time interval and a recommended maintenance time interval.

* * * * *